(12) United States Patent
Momiuchi et al.

(10) Patent No.: US 7,766,485 B2
(45) Date of Patent: Aug. 3, 2010

(54) DEVICE FOR FORMING VISIBLE IMAGE IN AIR

(75) Inventors: Masayuki Momiuchi, Itabashi-ku (JP); Hidei Kimura, Kawasaki (JP)

(73) Assignee: Burton Inc., Kawasaki (JP)

( * ) Notice: Subject to any disclaimer, the term of this patent is extended or adjusted under 35 U.S.C. 154(b) by 0 days.

(21) Appl. No.: 12/420,547

(22) Filed: Apr. 8, 2009

(65) Prior Publication Data

US 2009/0213340 A1    Aug. 27, 2009

Related U.S. Application Data

(60) Division of application No. 10/917,264, filed on Aug. 12, 2004, now Pat. No. 7,533,995, which is a continuation-in-part of application No. PCT/JP03/01375, filed on Feb. 10, 2003.

(30) Foreign Application Priority Data

Feb. 13, 2002 (JP) .............................. 2002-035641

(51) Int. Cl.
   *G03B 21/14* (2006.01)
(52) U.S. Cl. ........................................ 353/62; 353/122
(58) Field of Classification Search .................... 353/28, 353/62, 121, 133; 372/76; 345/37, 41, 60, 345/62
   See application file for complete search history.

(56) References Cited

U.S. PATENT DOCUMENTS

| 5,649,827 | A | 7/1997 | Suzaki |
| 5,871,267 | A | 2/1999 | Wende |
| 5,956,172 | A | 9/1999 | Downing |
| 6,466,184 | B1 | 10/2002 | Whitesell et al. |
| 6,575,581 | B2 | 6/2003 | Tsurushima |
| 6,894,768 | B2 | 5/2005 | Caldwell et al. |
| 6,917,355 | B1 | 7/2005 | Fergason |
| 2003/0227602 | A1 | 12/2003 | Scarasso |
| 2004/0218148 | A1 | 11/2004 | Perlin et al. |

FOREIGN PATENT DOCUMENTS

| JP | 2000-105350 A1 | 4/2000 |
| JP | 2001-312237 A1 | 11/2001 |
| JP | 2003-009184 A1 | 1/2003 |

*Primary Examiner*—William C Dowling
(74) *Attorney, Agent, or Firm*—Oblon, Spivak, McClelland, Maier & Neustadt, L.L.P.

(57) ABSTRACT

The present invention relates to a device for forming a visible image which can draw a two-dimensional or a three-dimensional visible image without having a scanning locus of a laser beam recognized.

The device for forming a visible image of the present invention is comprised of a laser source irradiating a laser beam in an invisible region, a scanning means for scanning said laser beam two-dimensionally or three-dimensionally, a condensing optical system for condensing said laser beam to a drawing scheduled point in the air for plasma emission of a gas, and a controlling means for controlling oscillation timing of said laser source and scanning timing of said scanning means so as to generate said plasma emission at said drawing scheduled point in a time series and for drawing a visible image as a residual image phenomenon of the plasma emission.

12 Claims, 7 Drawing Sheets

FIG.12 ized cision image as a residual image phenomenon of said plasma emission.

DEVICE FOR FORMING VISIBLE IMAGE IN AIR

CROSS-REFERENCE TO RELATED APPLICATIONS

This application is a divisional of and claims the benefit of priority under 35 U.S.C. §120 from U.S. Ser. No. 10/917,264, filed Aug. 12, 2004, which is a continuation-in-part of International Application No. PCT/JP03/01375, filed on Feb. 10, 2003, and claims the benefit of priority under 35 U.S.C. §119 from Japanese Patent Application Nos. 2002-35641, filed Feb. 13, 2002. The International application was published in Japanese on Aug. 21, 2002 as WO03/069590 A1, and is incorporated herein by reference in its entirety.

FIELD OF THE INVENTION

The present invention relates to a device for forming a visible image which can draw visible images such as letters, images, etc. in the air or water using laser beams.

BACKGROUND ART

There has been known a device for forming a visible image for drawing visible images on a screen or a wall by scanning a laser beam. Also, a visible-image forming device for forming a visible image by forming a screen in the air using smoke, irradiating a laser beam onto this screen and forming the visible image with a locus drawn on the screen by luminescent spots of scattered reflection of the laser beam is known (for example, see the Japanese Unexamined Patent Publication No. 2001-312237). These visible-image forming devices are used as a display device for displaying information. Moreover, as a visible-image forming device for forming a stereoscopic visible image in the air, those using a holography technique is known, and this holography is constituted that information to form the visible image is recorded on a film in the two-dimensional manner in order to form a visible image, and a three-dimensional visible image is formed by using this film.

If a laser beam in the visible region is used for drawing a visible image in the air, it is inconvenient because a locus of the laser beam in the visible region is seen when drawing the visible image. Also, when a visible laser beam is applied to a screen so as to draw a visible image in the air, the screen has to be formed in advance in the air, which results in the screen to be seen and it is not good. Moreover, there is a request for drawing a visible image in color in the air.

A primary object of the present invention is to provide a device for forming a visible image which can draw a visible image in the air or water without visible recognition of scanning locus of a laser beam. A second object of the present invention is to provide a device for forming a visible image which can draw a visible image in the air or water without forming a screen in the air or water. A third object of the present invention is to provide a device for forming a visible image which can draw a visible image which is not only planar but stereoscopic in the air or water. A fourth object of the present invention is to provide a device for forming a visible image which can draw a color visible image in the air or water.

DESCRIPTION OF THE INVENTION

The present invention is comprised of a laser source for emitting a laser beam in the invisible region, a scanning means for scanning said laser beam, a condensing optical system for condensing said laser beam at a drawing scheduled point in the air or water and carrying out plasma emission of a gas, and a control means for controlling oscillation timing of said laser source and a scanning timing of said scanning means so that said plasma emission is generated in a time series at said drawing scheduled point so as to draw a visible image as a residual image phenomenon of said plasma emission.

That is, it is so constituted that a laser beam is collected at a drawing scheduled point, existing air or water is made to emit plasma or plasma emission is carried out from a fluctuation in a refractive index or a plasma state, this light emission point is formed in a time series and a visible image is formed in the air as a residual image, and then, the plasma emission is carried out without having the laser beams crossed but using a laser beam of a single optical axis.

The above-mentioned laser beam in the invisible region is preferably an infrared laser beam.

Also, the device may be provided with a dome having a bulkhead dividing the outside from the inside, said visible image being formed in the air or water inside said bulkhead, and the bulkhead may be formed by a material which enables observation of said visible image from the outside and prevents penetration of said laser beam. The pressure in the inside of said bulkhead is reduced and said laser beam in the visible region may be an ultraviolet ray, or a noble gas may be filled inside said bulkhead.

Next, in the present invention, there are provided an invisible-region laser source for emitting a laser beam in the invisible region and a visible-region laser source coaxial with said invisible-region laser beam for emitting a laser beam in the visible region, each of said laser beams is coaxially scanned by a scanning means, said invisible leaser beam is collected at a drawing scheduled point in the air or water, the drawing scheduled point is rapidly heated so as to generate a fluctuation in a refractive index, oscillation timing of said laser source and scanning timing of said scanning means are controlled by a controlling means so that the fluctuation in the refractive index is generated in a time series at said drawing scheduled point, and a visible image is drawn as a residual image phenomenon of scattered luminescent spots generated in a time series by irradiation of said visible laser beam.

In the above condensing optical system, such a constitution is used that the fluctuation in the refractive index is generated as a preceding step of plasma emission, and the visible-region laser beam is irradiated at that stage, but it may be so constituted that the visible-region laser beam is irradiated in the plasma state immediately after generation of plasma or the like. Said invisible-region laser beam shall be an infrared laser beam, while the visible-region laser beam may be the whole or a part of a red laser beam, a blue laser beam and a green laser beam. Moreover, said condensing optical system may be constituted by a condenser lens or a concave mirror.

Also, in the present invention, if a fluctuation in the refractive index is generated in a time series at a drawing scheduled point so as to draw a visible image by irradiation of a visible-region laser beam, said condensing optical system is comprised of a convex mirror for reflecting said invisible-region laser beam as a scattered light and a concave mirror for condensing the invisible-region laser beam reflected by the convex mirror at each of said drawing scheduled points, and said concave mirror has preferably a coaxial transparent window formed through which said invisible-region laser beam penetrates.

In said condensing optical system, its focal distance can be changed so as to enable change of a distance from its laser source to each of said drawing scheduled points, and a visible image can be drawn stereoscopically in the air or water. Also, it is preferable that this condensing optical system has a plurality of condenser lenses with different focal distances and said change of focal distance is carried out by replacement of said condenser lenses. This condensing optical system may have a zoom lens so that said change of focal distance can be carried out by said zoom lens.

Moreover, said condensing optical system may have a condenser lens which is movable along the optical axis of said laser source so that the distance from the condenser lens to each of said drawing scheduled points can be changed. Said condenser optical system may have a condenser lens and an optical path length changing optical element for changing the distance from the condenser lens to each of said drawing scheduled points.

Also, it is preferable that said laser source irradiates a laser beam having a pulse width of 50 ns or less, repetition frequency of 10 Hz or more and output power density of $10^8$ W/cm$^2$ or more at a focusing point.

Said scanning means may be those having a polygon mirror.

It is preferable that a plurality of said invisible-region laser source are arranged in the direction crossing the scanning direction of the polygon mirror, and said controlling means is constituted to control oscillation stop of the plurality of invisible-region laser source.

Said scanning means may have a movable mirror for scanning the invisible-region laser beam irradiated from said invisible-region laser source in the direction crossing the scanning direction of said polygon mirror.

Also, the present invention may have a laser source for irradiating a laser beam in the invisible region, a scanning means for scanning said laser beam, and a controlling means for controlling oscillation timing of said laser source and scanning timing of said scanning means for drawing a visible image in said air or water as a residual image phenomenon of light emission at a drawing scheduled point in said air or water, and said laser source may be those irradiating a laser beam in the invisible region having a self-converging action.

Preferred embodiments when the device for forming a visible image of the present invention is used in the air will be described below referring to the drawings.

Figure 1:
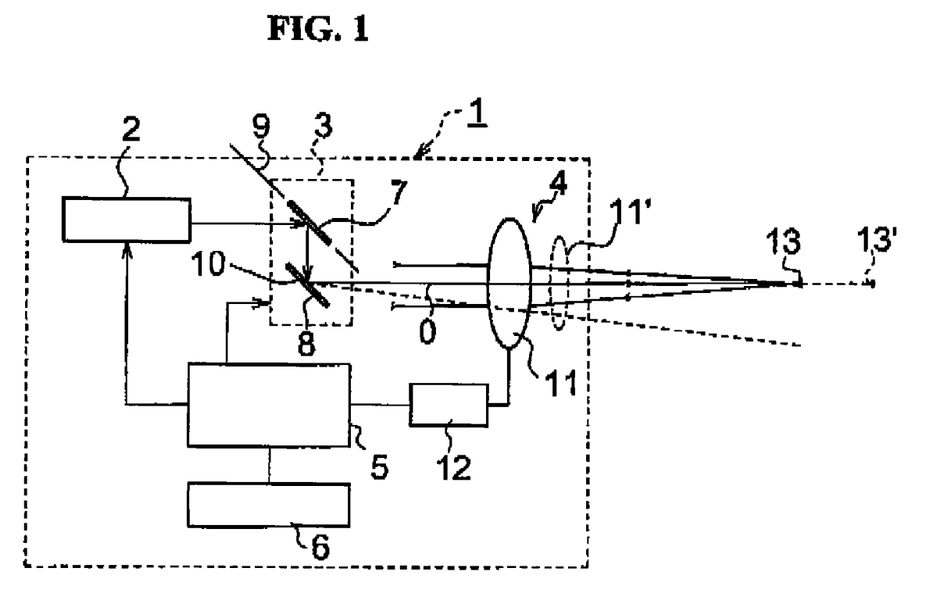
FIG. 1 is a schematic view showing a preferred embodiment 1 of a device for forming a visible image in the air of the present invention.

FIG. 1 is a schematic view of a visible-image forming device 1 according to the preferred embodiment 1 of the present invention. This visible-image forming device 1 has a laser source 2, a scanning means 3, a condensing optical system 4, a controlling means 5 and an operation input means 6.

For the laser source 2, an Nd:YAG laser device, an Nd:Glass laser device or a $CO_2$ laser device, for example, is used, and any of them oscillates in a wavelength region of the wavelength of 1µ or more and irradiates a laser beam in the invisible region, that is, an infrared laser beam. This infrared laser beam is hardly subject to influence of absorption or scattering caused by atmosphere and has a characteristic of propagation to a remote location.

The scanning means 3 is comprised in general of a rotational mirror 7 and an oscillating mirror 8. The rotational mirror 7 is rotated around a rotational axis 9, while the oscillating mirror 8 is rotated around a rotational axis 10. The rotational mirror 7 and the oscillating mirror 8 play a role of scanning the infrared laser beam in the X-Y direction.

The condensing optical system 4 has a condenser lens 11. The infrared laser beam irradiated from the laser source 2 is oscillated in the X-Y direction by the scanning means 3 and led to the condenser lens 11. The condenser lens 11 plays a role for collecting its infrared laser beam and is constituted to be movable along the irradiation optical axis O of the infrared laser beam, and 12 is its driving device. Additionally, a lens 11' (shown dotted in FIG. 1) may be provided to change the optical path length of the lens 11.

The controlling means 5 has a role of controlling the laser source 2, the scanning means 3 and the driving device 12, and the operation input means 6 is used for inputting information required for control of a visible image or the like to be formed in the air.

The laser source 2 is oscillated by the controlling means 5 in a Q switch mode. The laser source 2 irradiates a pulse beam of about 10 nanoseconds (ns), when oscillated in the Q switch mode.

If the energy density of the pulse beam is 10 millijoules (mJ) per pulse, when this pulse beam is narrowed to a spot beam with the diameter of 0.1 mm, a peak output of about $10^{10}$ W/cm$^2$ is gained.

Here, an Nd:YAG laser is used for the laser source 2, its oscillating wave length is 1.06 µm, the energy density per pulse is 10 mJ, repetition frequency is 20 Hz, and it is oscillated intermittently.

By this narrowing of the infrared laser beam, breakdown is caused in a gas in the air, which locally brings the gas into a high-density plasma state, whereby a flash light is generated locally. Also, together with the flash light, an impact noise is generated.

That is, when an infrared laser beam is collected by the condenser lens 11 at a visible-image formation scheduled point (drawing scheduled point) 13 in the air, a gas existing at the visible-image formation scheduled point 13 is locally brought into the plasma state, a flash light is generated at the visible-image formation scheduled point 13 in the air, and this visible-image formation scheduled point 13 is recognized as a light emitting point when visibly checked from a remote location.

Figure 2:
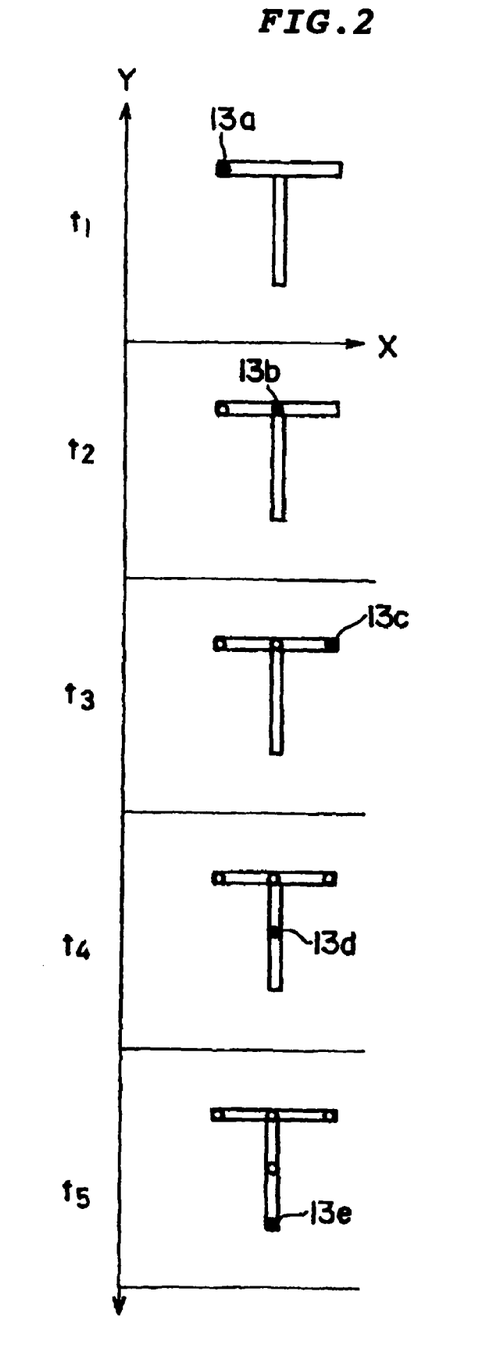
FIG. 2 is an explanatory view for explaining the state for forming a visible image in the air in a time series.

Thus, as shown in FIG. 2, at a time t1, the scanning means 3 is controlled in the X direction so that an infrared laser beam is led to a visible-image formation scheduled point 13a in the air, and the laser source 2 is oscillated immediately after that so as to have the gas at the visible-image formation scheduled point 13a emit plasma light, and then, at a time t2, the scanning means 3 is controlled in the X direction so that the infrared laser beam is led to a visible-image formation scheduled point 13b in the air and the laser source 2 is oscillated immediately after that so as to have the gas at the visible-image formation scheduled point 13b emit plasma light and next, at a time t3, the scanning means 3 is controlled in the X direction so that the infrared laser beam is led to a visible-image formation scheduled point 13c in the air and the laser source 2 is oscillated immediately after that so as to have the gas at the visible-image formation scheduled point 13c emit plasma light.

By this, a line segment of "–," for example, is drawn in the X direction.

Next, at a time t4, the scanning means 3 is controlled in the Y direction so that the infrared laser beam is led to a visible-image formation scheduled point 13d in the air and the gas at the visible-image formation scheduled point 13d is made to emit plasma light, and then, at a time t5, the scanning means 3 is controlled in the Y direction so that the infrared laser beam is led to a visible-image formation scheduled point 13e in the air and the gas at the visible-image formation scheduled point 13e is made to emit plasma light.

Figure 3:
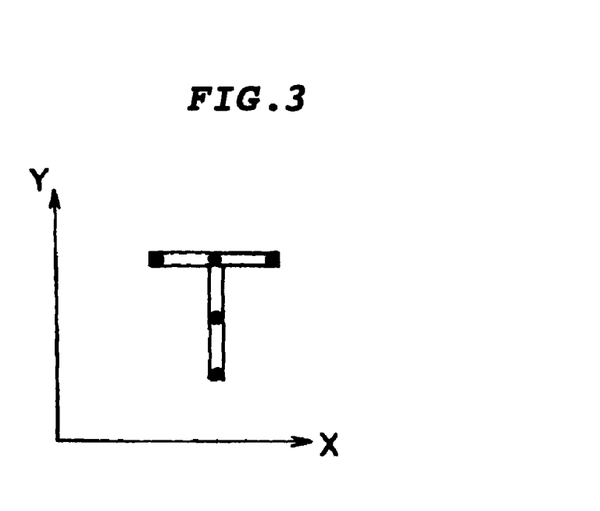
FIG. 3 is a view showing a stationary state of a visible image formed in the air as a residual image phenomenon.

If this is repeated at an interval within 0.1 second, for example, it appears to emit light continuously as a residual image to human eyes, and as shown in FIG. 3, a visible image of "T" in general appears to be drawn in the air.

That is, if plasma emission from the time t1 to the time t5 is repeated 10 times or more in 1 second, a visible image T is visually recognized as drawn in the stationary state in the air.

Here, the controlling means 5 controls oscillation timing of the laser source 2 and scanning timing of the scanning means 3 for drawing a visible image in the air as a residual image phenomenon of an emitted light generated in a time series at each of the drawing scheduled points 13a to 13e in the air.

When the condenser lens 11 is moved along the direction of the irradiation optical axis O, the condensing position of the condenser lens 11 is changed, by which the laser source 2, that is, the distance from the device body to the drawing scheduled point 13 is changed. For example, when the condenser lens 11 is moved in the right direction from the position shown by a solid line, its condensing position is displaced to the right direction.

As a result, the drawing scheduled position is changed from the drawing scheduled point 13 to a drawing scheduled point 13', and by controlling the scanning means 3 and the driving device 12, the infrared laser beam can be scanned three-dimensionally in the XYZ directions, whereby a visible image is drawn in the stereoscopic manner in the air.

Figure 4:
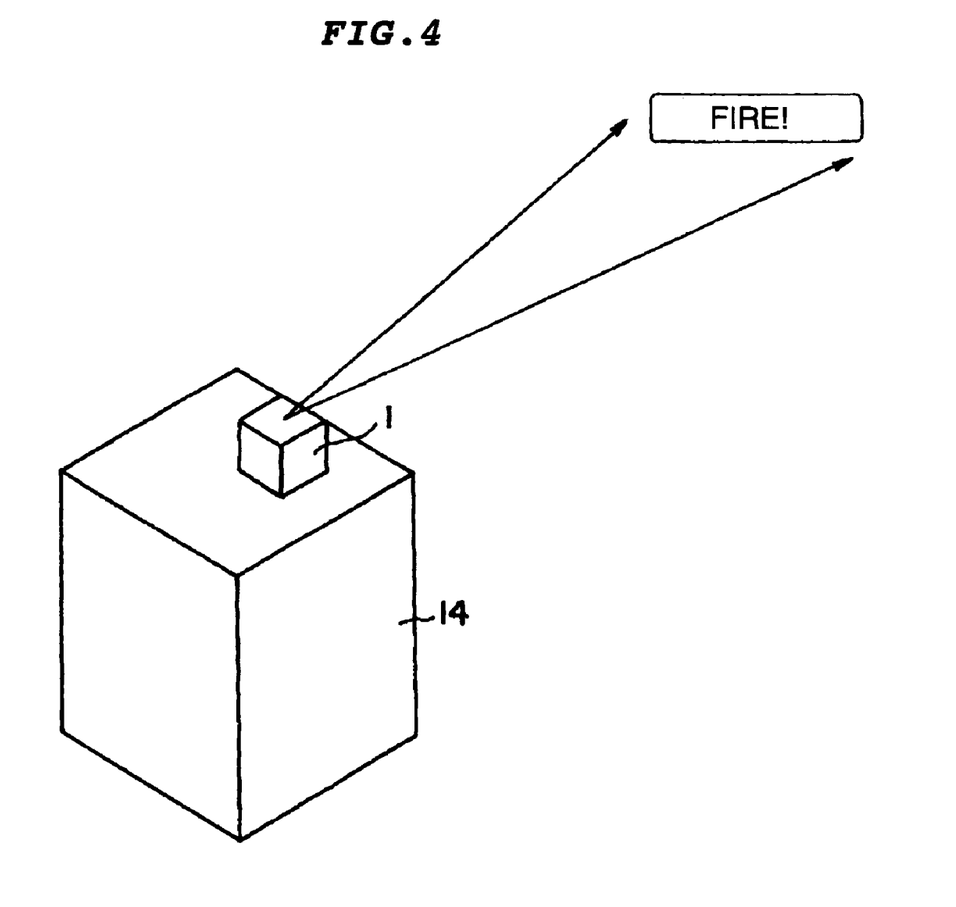
FIG. 4 is an outline drawing showing the state where the device for forming a visible image in the air is installed in a building.

Therefore, if this visible-image forming device 1 is installed on the roof of a building 14 such as a fire station and this visible-image forming device 1 is operated at occurrence of a fire or the like so as to display information of emergency such as "Fire Breaking" in the air as a visible image, the fire information can be notified to residents at a time.

According to the preferred embodiment 1, since a visible image can be drawn in the air without having a scanned locus of a laser beam recognized, its appearance is favorable.

Here, the condenser lens 11 is moved along the irradiation optical axis O so as to change the distance from the laser source 2 to the drawing scheduled point, but a plurality of condenser lenses 11 with different focal distance may be provided in the condensing optical system 4 so that the distance from the laser source 2 to the drawing scheduled point can be changed by switching the condenser lenses 11.

Also, a zoom lens may be provided in the condensing optical system 4 so that the focal distance is changed by this zoom lens so as to change the distance from the laser source 2 to the drawing scheduled point.

Moreover, an optical path length changing optical element may be provided on the side of laser beam irradiation of the condenser lens 11 so that the distance from the laser source 2 to the drawing scheduled point can be changed by insertion/removal of the optical path length changing optical element.

In theory, if those capable of outputting a laser beam with the pulse width of 50 ns or less, the repetition frequency of 10 Hz or more and the output power density of $10^8$ W/cm$^2$ or more at the condensing point is used as the laser source 2, it seems that a visible image can be drawn in the air without a problem.

Figure 5:
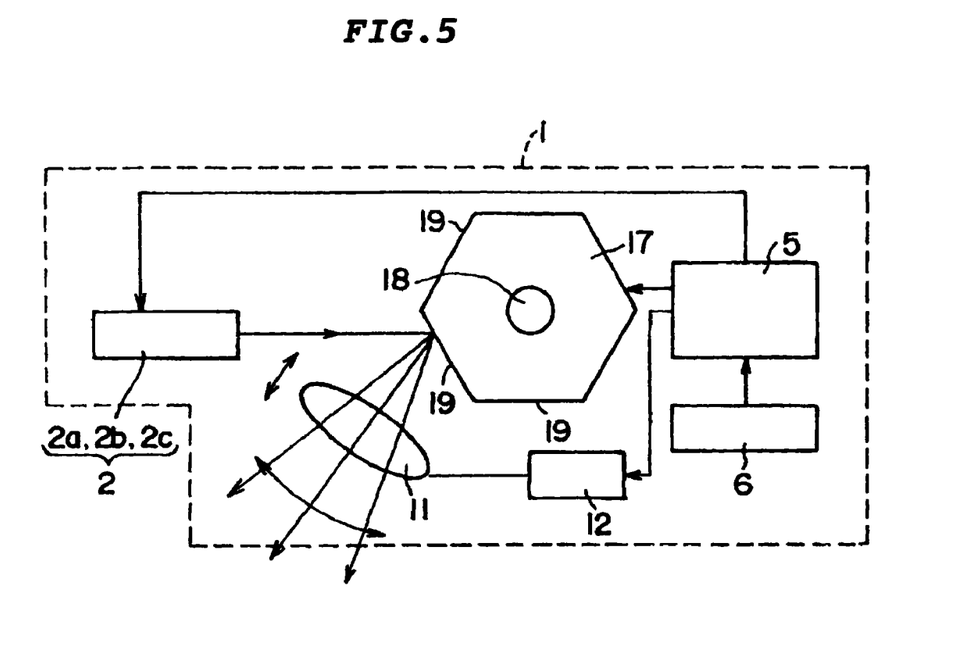
FIG. 5 is a schematic view showing a preferred embodiment 2 of the device for forming a visible image in the air of the present invention.
Figure 6:
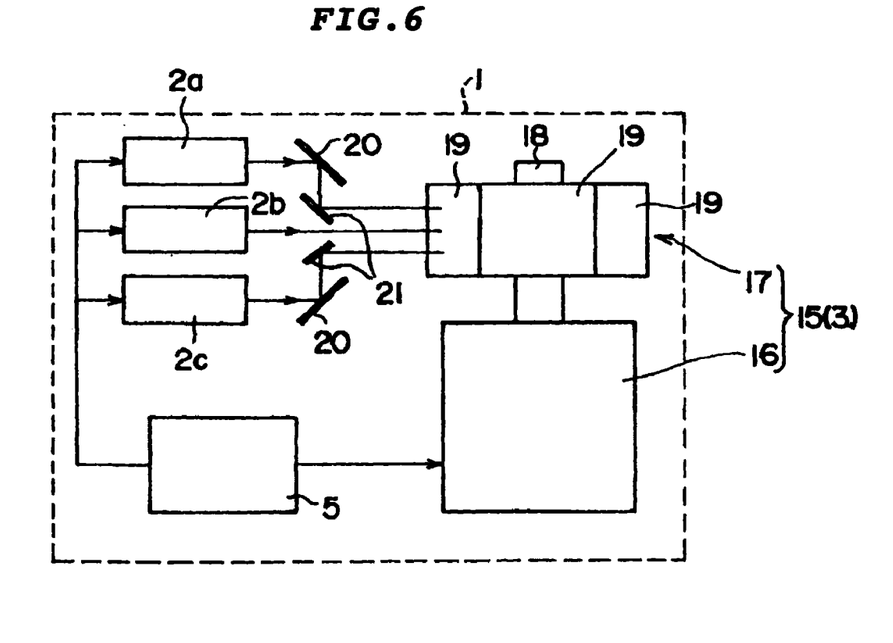
FIG. 6 is a side view of the device for forming a visible image in the air shown in FIG. 5.

Next, in the visible-image forming device 1 of the preferred embodiment 2, as shown in FIGS. 5 and 6, a polygon mirror device 15 is used for the scanning means 3 of the visible-image forming device 1.

This polygon mirror device 15 is constituted by a spindle motor 16 and a polygon mirror body 17. A numeral 18 is a rotational axis of the polygon mirror device 15 and a numeral 19 is a mirror surface of the polygon mirror body.

Also, the laser source 2 is constituted by 3 laser sources 2a to 2c. Each of the laser sources 2a to 2c is arranged in the direction crossing the scanning direction of the polygon mirror. Each of the laser sources 2a to 2c and the polygon mirror device 15 are controlled by the controlling means 5.

The infrared laser beam irradiated from each of the laser sources 2a and 2c is appropriately reflected by reflecting mirrors 20, 21, led to the mirror surface 19, and scanned by the polygon mirror device 15 in the X direction.

Also, by oscillating each of the laser sources 2a, 2b and 2c in a time series, the laser beam is scanned in the Y direction.

A visible image can be appropriately drawn in the air by oscillation control of each of the laser sources 2a to 2c and rotation of the mirror surface 19 of the polygon mirror body 17. Here, the number of laser sources 2 is 3, but not limited to that number, it can be 4 or more.

According to this preferred embodiment 2, scanning by the scanning means 3 can be only in the one-dimensional direction, and in that case, the scanning means 3 can be simplified when compared with the preferred embodiment 1.

Figure 7:
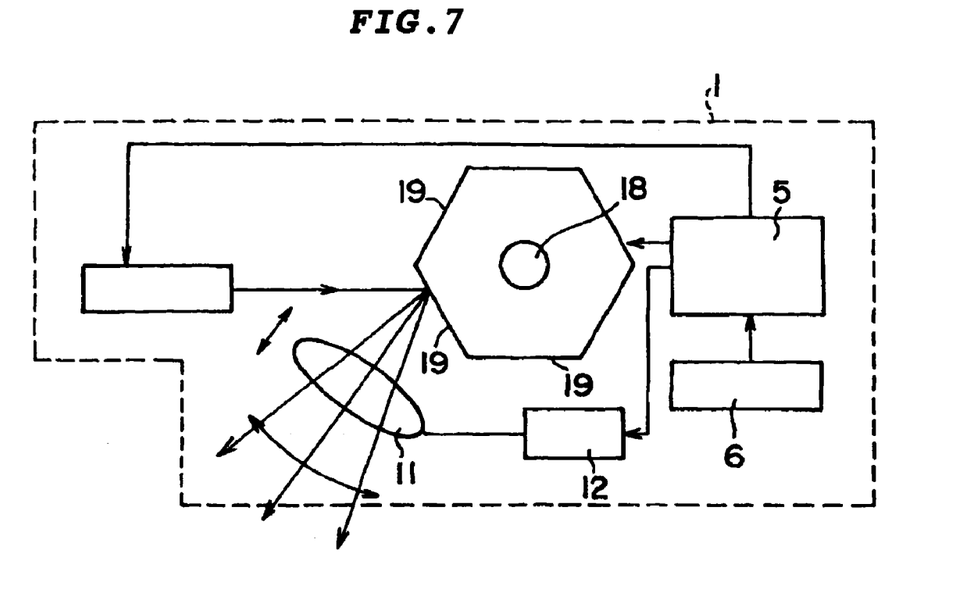
FIG. 7 is a schematic view showing a preferred embodiment 3 of the device for forming a visible image in the air of the present invention.
Figure 8:
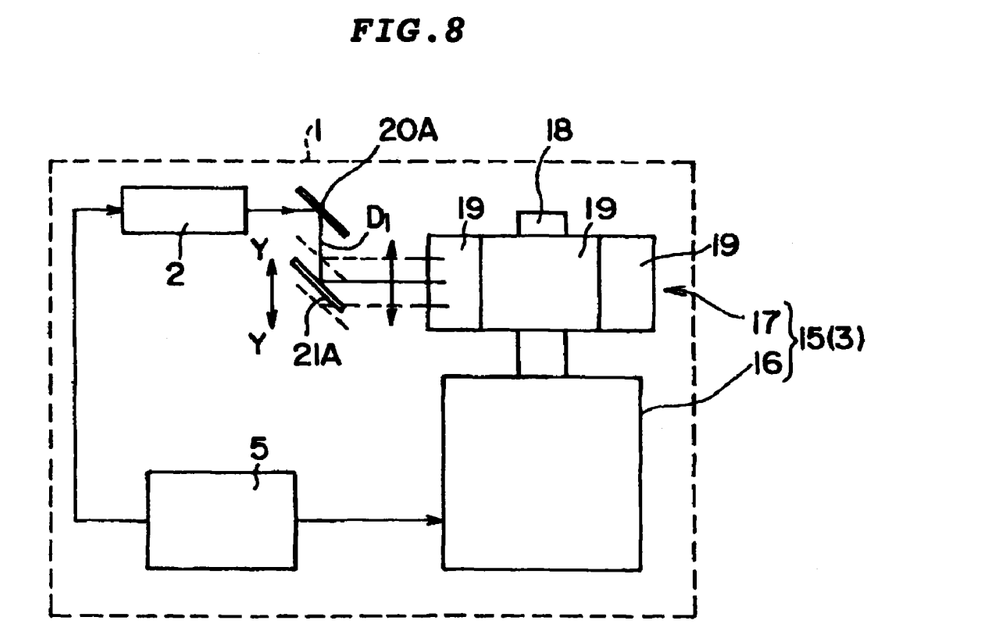
FIG. 8 is a side view of the device for forming a visible image in the air shown in FIG. 7.

Next, in the visible-image forming device 1 of the preferred embodiment 3, as shown in FIGS. 7 and 8, the scanning means 3 is comprised of the polygon mirror device 15, a reflecting mirror 20A and a movable mirror 21A. There is only one laser source 2 provided.

The reflecting mirror 20A and the movable mirror 21A are provided between the laser source 2 and the mirror surface 19 of the polygon mirror body 17.

The infrared laser beam irradiated from the laser source 2 is reflected by the reflecting mirror 20A and led to the movable mirror 21A, while the movable mirror 21A reflects the infrared laser beam reflected by the reflecting mirror 20A toward the mirror surface 19. The movable mirror 21A is moved in the direction crossing the scanning direction of the polygon mirror, in other words, along the reflecting optical axis 01 of the reflecting mirror 20A, and the infrared laser beam is scanned in the Y direction by movement of the movable mirror 21A.

According to this preferred embodiment 3, the structure of the scanning means 3 can be simplified without increasing the number of laser sources 2.

Figure 9:
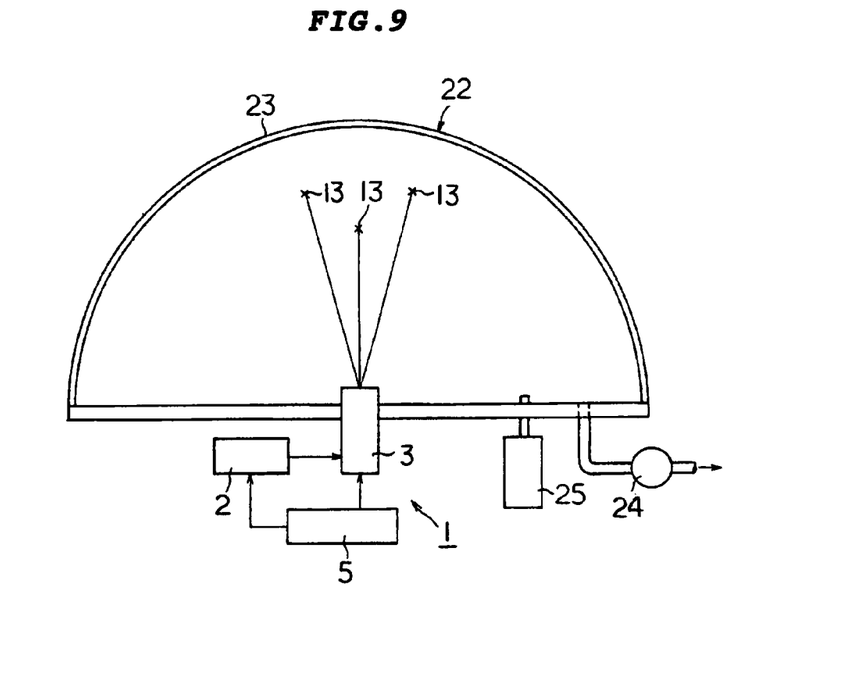
FIG. 9 is a schematic view showing a preferred embodiment 4 of the device for forming a visible image in the air of the present invention.

Next, in the visible-image forming device 1 of the preferred embodiment 4, the visible-image forming device 1, as shown in FIG. 9, is for forming a visible image in the air in a dome 22, and a numeral 23 is a bulkhead constituting the dome 22. An infrared laser beam can be used for the laser beam 2 of the visible-image forming device 1 as in the preferred embodiment 1, but here, a laser source irradiating a laser beam in the ultraviolet region as a laser source for irradiating a laser beam in the invisible region is used. For this laser source, FHG of a Nd:YAG, for example, that is, the fourth higher harmonic (wavelength: 266 nm) is used.

The dome 22 is divided by the bulkhead 23 into the outside and the inside, and air inside of the dome 22 is drained through a vacuum pump device 24, the air is replaced by a noble gas supplied from a reservoir 25, and the pressure of the noble gas in the dome 22 is reduced to 1 atmosphere or less.

Argon, neon or krypton is used for the noble gas.

For the bulkhead 23, a material with a characteristic which transmits a visible light and absorbs a laser beam in the ultraviolet region, an acrylic resin material with an ultraviolet absorbing coating formed, for example, may be used.

Action of the laser beam 2, the scanning means 3 and the controlling means 5 is the same as those of the preferred embodiment 1, and since the noble gas is sealed in the dome 22, plasma emission of a gas existing at the visible-image formation scheduled point 13 is possible without using a high output for the laser source 2, only if those with a photon energy larger than an ionization energy of molecules/atoms of the noble gas, such as a laser source of low output in the ultraviolet region, is used.

If the noble gas is neon, the gas existing at the visible-image formation scheduled point 13 emits a pink light by the laser beam in the ultraviolet region, while if the noble gas is argon, it emits a blue light and when the noble gas is brought into the plasma state, light is emitted in the color inherent to the noble bas, whereby a color visible image can be drawn in the air in the stereoscopic manner.

As a laser source, an infrared laser source generating a multi-photon absorption may be used, and in short, anything capable of generating a photon energy enough to have the noble gas molecules and atoms emit light may be used. If this infrared laser source is to be used, such a material that absorbs the infrared laser is used for the bulkhead 23. Here, a noble gas is sealed inside the dome 22, but a nitrogen gas or an oxygen gas may be reduced and sealed in the dome 22.

In the case of the preferred embodiment 4, a color visible image can be drawn in the air in the stereoscopic manner without having the scanning locus of the laser beam recognized.

Figure 10:
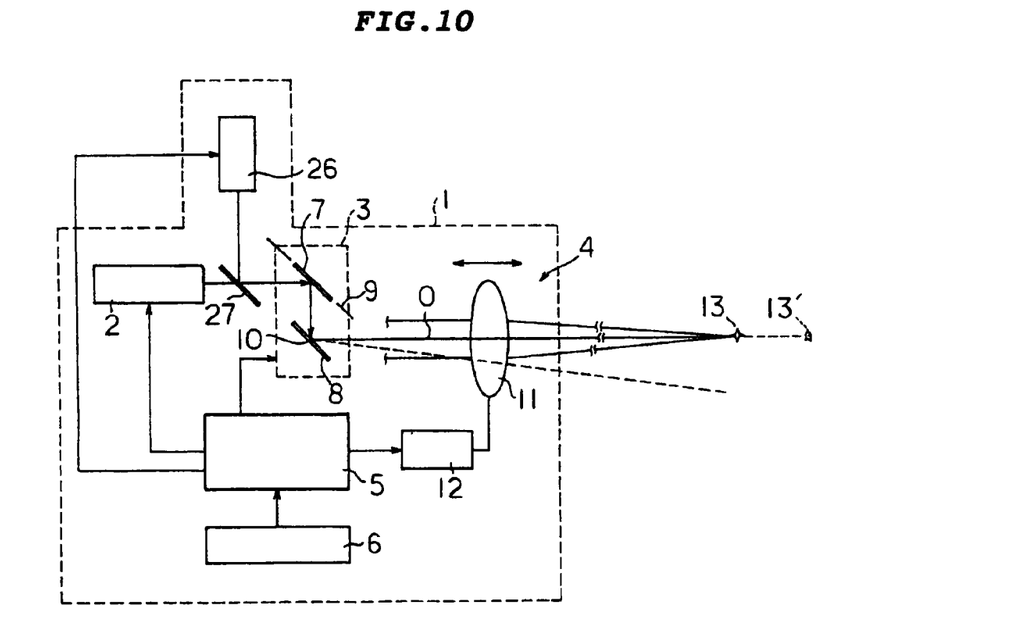
FIG. 10 is a schematic view showing a preferred embodiment 5 of the device for forming a visible image in the air of the present invention.

Next, FIG. 10 shows the visible-image forming device 1 of the preferred embodiment 5 in the constitution that the laser source 2 generating the laser beam in the invisible region is arranged coaxially with a laser source 26 generating a laser beam in the visible region so as to lead to the scanning means 3. For the laser source 26 in the visible region, SHG of an Nd:YAG laser (wavelength: 532 nm or 473 nm or 660 nm), an He—Ne laser or an Ar laser may be used, but here, the laser source 26 irradiates a laser beam in green (G). This laser source 26 is oscillated by the controlling means 5 intermittently in synchronization with the laser source 2.

For the laser source 2, a carbon dioxide gas ($CO_2$) laser, Nd:YAG laser are used. Between the laser source 2 and the rotational mirror 7, a dichroic mirror 27 is provided, and this dichroic mirror 27 has an optical characteristic that transmits a laser beam in the invisible region and reflects a laser beam in the green wavelength region.

The laser beam in the invisible region from the laser source 2 and the laser beam in the visible region from the laser source 26 are made coaxial by the dichroic mirror 27, led by the scanning means 3 and scanned by this scanning means 3 in the XY directions.

Output power of the laser source 2 is at a level that rapidly heats a gas existing at the drawing scheduled point 13 and causes a fluctuation in refractive index at the drawing scheduled point.

When a laser beam in the visible region hits the drawing scheduled point 13 where the fluctuation in the refractive index was caused, the laser beam in the visible region is scattered, and this scattering causes luminescent spots at the drawing scheduled point 13. By irradiating the laser beam in the invisible region and the laser beam in the visible region at the same time so as to draw a locus of scattered luminescent spots in a time series generated based on the scattering at each of the drawing scheduled points 13a to 13e, a visible image is drawn in the air as a residual image phenomenon of the luminescent spots in a time series.

In order to draw this visible image, the controlling means 5 controls oscillation timing of each of the laser sources 2 and 26, scanning timing of the scanning means 3 and driving timing of the driving device 12.

According to this preferred embodiment, a color visible image can be drawn in the atmospheric air in the three dimensional manner.

Figure 11:
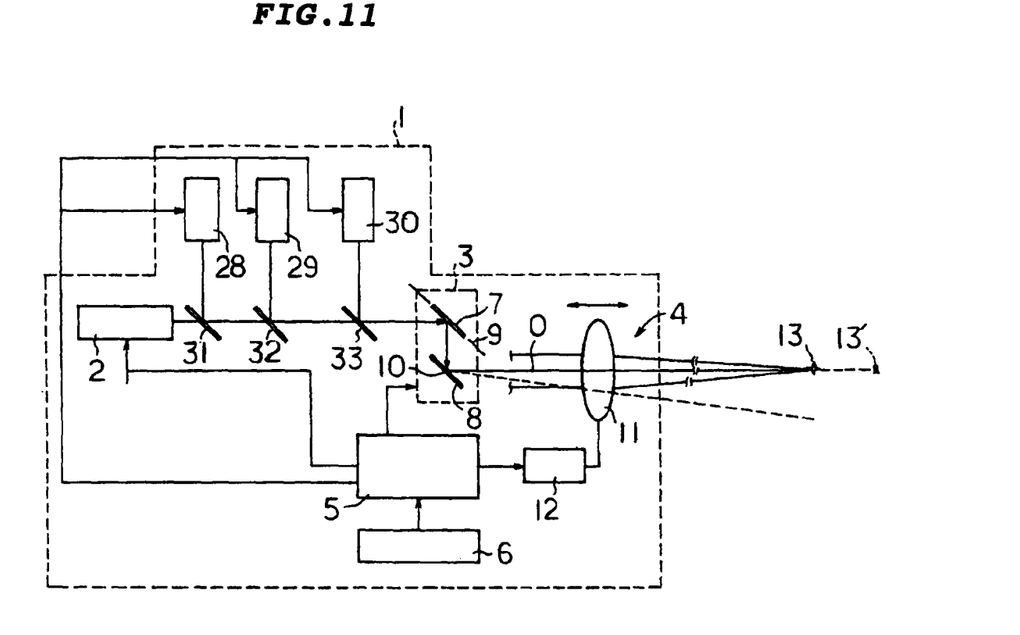
FIG. 11 is a schematic view showing a variation of the device for forming a visible image in the air shown in FIG. 10.

FIG. 11 is a variation and a view showing a constitution in which the laser source 2 generating a laser beam in the invisible region, a red laser source 28 irradiating an R-color laser beam, a green-color laser source 29 irradiating a G-color laser beam and a blue-color laser source 30 irradiating a B-color laser beam are made coaxial and led to the scanning means 3.

Between the laser source 2 and the scanning means 3, dichroic mirrors 31, 32, 33 are provided. The dichroic mirror 31 has a reflective characteristic that transmits a laser beam in the invisible region and reflects the red laser beam.

The dichroic mirror 32 has a characteristic that transmits a laser beam in the invisible region and the red laser beam and reflects the green laser beam.

The dichroic mirror 33 has a characteristic that transmits a laser beam in the invisible region, the red laser beam and the green laser beam and reflects the blue laser beam.

Each of the laser beams is made coaxial by the dichroic mirrors 31, 32, 33, led by the scanning means 3 and scanned by the scanning means 3 so that a visible image is drawn in the air.

The oscillation timing of each of the laser sources 28, 29 30 and the oscillation stop are controlled by the controlling means 5, by which a desired full-color visible image is drawn in the air.

Figure 12:
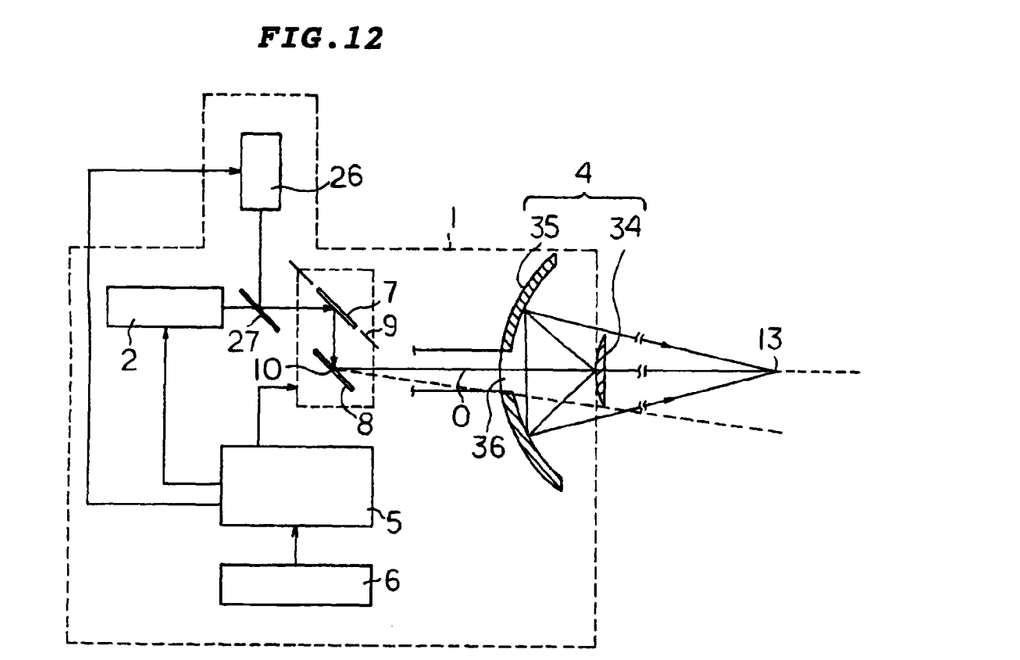
FIG. 12 is a schematic view showing a preferred embodiment 6 of the device for forming a visible image in the air of the present invention.

Next, in the visible-image forming device 1 of the preferred embodiment 6, as shown in FIG. 12, the condensing optical system 4 is comprised of a convex mirror 34 and a concave mirror 35, laser beams of each of the laser sources 2, 26 are scattered by the convex mirror 34, and the laser beams scattered by the convex mirror 34 is condensed by the concave mirror 35 at the visible-image formation scheduled point 13, and the concave mirror 35 has a transparent window 36 formed through which each of the laser beams is transmitted.

The radius of curvature of the convex mirror 34 and the radius of curvature of the concave mirror 35 and the positional relationship between the convex mirror 34 and the concave mirror 35 are set to a distance from the laser source 2 to the image formation scheduled point 13, that is, a distance from the device body to the visible-image formation scheduled point 13.

According to this, the distance from the device body to the visible-image formation scheduled point 13 can be made farther.

As mentioned above, each of the preferred embodiments is constituted to have the condenser optical system 4, but a laser source irradiating a laser beam in the invisible region having a self-conversing action may be used.

Also, in the above preferred embodiments, the case where a visible image such as letters, images, etc. is drawn in the air was exemplified, but with the present invention, even if the drawing scheduled point is in the water, a visible image can be drawn with the same constitution as that of the above preferred embodiments. Since these constitutions are the same as that of the above preferred embodiments, its explanation will be omitted.

As mentioned above, according to the present invention, a visible image in desired colors can be drawn not only two-dimensionally but also three-dimensionally without having a scanning locus of a laser beam recognized or forming a screen in the air or water.

What is claimed is:

1. A device for forming a visible image comprising:
   a pulse laser source which irradiates a pulse laser beam with a pulse width of 50 ns or less;
   a visible-region laser source which is coaxial with the pulse laser beam and irradiates a visible-region laser beam;
   a scanning device which coaxially scans each of the pulse laser beam and visible-region laser beams;
   a condensing optical system which condenses the pulse laser beam at a drawing scheduled point in air or water so as to generate a fluctuation in a refractive index by heating a gas or liquid at the drawing scheduled point; and
   a controlling device which controls oscillation timing of the pulse laser source and scans timing of the scanning device so as to generate the fluctuation in the refractive index at the drawing scheduled point in a time series and draw a visible image by generating a residual image phenomenon of scattered luminescent spots through irradiation of the visible-region laser beam in the time series.

2. A device for forming a visible image as in claim 1, wherein the pulse laser beam is an infrared laser beam, the visible-region laser beam is a laser beam of at least one of red-color laser beam, blue-color laser beam and green-color laser beam.

3. A device for forming a visible image as in claim 1, wherein the visible-region laser source comprises a red-color laser source, a green-color laser source and a blue-color laser source.

4. A device for forming a visible image comprising:
   a pulse laser source which irradiates a pulse laser beam with a pulse width of 50 ns or less;
   a visible-region laser source which is coaxial with the pulse laser beam and irradiates a visible-region laser beam;
   a scanning device which coaxially scans each of the pulse laser beam and visible-region laser beam;
   a condensing optical system which condenses the pulse laser beam at a drawing scheduled point in air or water so as to generate a fluctuation in a refractive index by heating a gas or liquid at the drawing scheduled point; and
   a controlling device which controls oscillation timing of the pulse laser source and scans timing of the scanning device so as to generate the fluctuation in the refractive index at the drawing scheduled point in a time series and draw a visible image by generating a residual image phenomenon of the scattered luminescent spots through irradiation of the visible-region laser beam in the time series,
   wherein the condensing optical system comprises a convex mirror provided to reflect the invisible-region laser beam as a scattered light and a concave mirror provide to condense the pulse laser beam reflected by the convex mirror at each of the drawing scheduled points, and the concave mirror has a transparent window coaxially formed through which the pulse laser beam is transmitted.

5. A device for forming a visible image as in claim 4, wherein the condensing optical system is configured to change a focal distance such that a distance from the laser source to each of the drawing scheduled points is changed and a visible image is drawn in the air or water in a stereoscopic manner.

6. A device for forming a visible image as in claim 5, wherein the condensing optical system has a plurality of condenser lenses with different focal distances, and the condensing optical system is configured to change the focal distance by switching the condenser lenses.

7. A device for forming a visible image as in claim 5, wherein the condensing optical system has a zoom lens, and the condensing optical system is configured to change the focal distance by the zoom lens.

8. A device for forming a visible image as in claim 1, wherein the pulse laser source is configured to irradiate a laser beam with the pulse width of 50 ns or less, a repetition frequency of 10 Hz or more and output power density at a condensing point of $10^8$ W/cm$^2$ or less such that the pulse laser source is controlled to avoid plasma emission.

9. A device for forming a visible image as in claim 1, wherein the single laser source is configured to irradiate a laser beam in a visible region with one optical axis.

10. A device for forming a visible image as in claim 1, wherein the pulse laser source and the visible-region laser source are configured to irradiate the pulse laser beam and the visible-region laser beam in an invisible region and a visible region, respectively, with one optical axis.

11. A device for forming a visible image comprising:
   a pulse laser source which irradiates a pulse laser beam with a pulse width of 50 ns or less in visible-region;
   a scanning device which scans the pulse laser beam;

a condensing optical system which condenses the pulse laser beam at a drawing scheduled point in air or water so as to generate a fluctuation in a refractive index by heating a gas or liquid at the drawing scheduled point; and a controlling device which controls oscillation timing of the pulse laser source and scans timing of the scanning device so as to generate the fluctuation in the refractive index at the drawing scheduled point in a time series and draw a visible image by generating a residual image phenomenon of scattered luminescent spots through irradiation of the visible-region laser beam in the time series.

12. A device for forming a visible image as in claim 11, wherein the condensing optical system comprises a convex mirror provided to reflect the invisible-region laser beam as a scattered light and a concave minor provide to condense the pulse laser beam reflected by the convex mirror at each of the drawing scheduled points, and the concave mirror has a transparent window coaxially formed through which the pulse laser beam is transmitted.

* * * * *